United States Patent [19]

Fahlen et al.

[11] 4,245,194
[45] Jan. 13, 1981

[54] COMPACT PULSED GAS TRANSPORT LASER

[75] Inventors: Theodore S. Fahlen, San Jose; David J. Clark, Whittier, both of Calif.

[73] Assignee: GTE Products Corporation, Stamford, Conn.

[21] Appl. No.: 57,928

[22] Filed: Jul. 16, 1979

[51] Int. Cl.$^3$ .............................................. H01S 3/11
[52] U.S. Cl. ........................ 331/94.5 D; 331/94.5 C; 331/94.5 G
[58] Field of Search .................... 331/94.5 D, 94.5 C

[56] References Cited

U.S. PATENT DOCUMENTS 3,772,610  11/1973  Foster et al. .................... 331/94.5 G

OTHER PUBLICATIONS

"Performance of a Compact Sealed 200-W $CO_2$ Laser" by Fahlen, *IEEE Quant. Electron.*, vol. QE-11, pp. 848-849 (Oct. 1975).

*Primary Examiner*—William L. Sikes
*Assistant Examiner*—Leon Scott, Jr.
*Attorney, Agent, or Firm*—John F. Lawler

[57] ABSTRACT

A physically compact gas transport laser operable at high pulse rates (greater than 1 kHz) in a high vacuum (greater than $10^{-5}$ Torr) is achieved by flowing the active gas at high velocity (greater than 50 m/sec) between two discharge electrodes in a hermetically sealed housing containing squirrel cage type blowers, a heat exchanger and the laser electrodes. A pulse forming network and blower motors are mounted externally of the housing as is the optical resonator assembly. A central partition divides the housing interior into upper and lower gas flow channels. The blowers are located in the lower channel at the housing end downstream from the electrodes and are rotatable in a plane parallel to the plane of the partition. The heat exchanger is located at the opposite end of the housing and both cools and stabalizes the flow of the circulating gas. The housing is a unitary structure having openings for installation of the blowers, heat exchanger and optical windows, which openings are closed by removable metal-to-metal sealing flanges for permitting access to the housing interior without compromising high vacuum integrity of the system.

12 Claims, 6 Drawing Figures

COMPACT PULSED GAS TRANSPORT LASER

This invention was made under a contract with the Department of the Air Force.

RELATED APPLICATIONS

Ser. No. 057,927 PULSED LASER ELECTRODE ASSEMBLY by Fahlen et al.
Ser. No. 057,929 LASER OPTICAL RESONATOR ASSEMBLY by Fahlen et al.

BACKGROUND OF THE INVENTION

This invention relates to lasers and more particularly to a compact pulsed gas transport laser.

There is need for a source of coherent light at the 2- to 4-micrometer band which is capable of producing 5 watts or more of pulsed average output power continuously for several hours and is sufficiently compact (about 10 ft.$^3$) and light weight to be practicable for airborne use. Such a laser is useful for optical countermeasures and reconnaissance. No known laser head is available which meets these requirements. A laser head is defined as that part of the laser system including and within the vacuum enclosure (including the heat exchanger, discharge electrodes, optical path, gas flow system), the optical cavity system (including the mirror, windows, and optical bench), and the integral pulse forming network.

One type of prior compact, lightweight laser head is a scaled-down version of the carbon dioxide laser described in U.S. Pat. No. 3,772,610 and in an article entitled "Performance of a Compact Sealed 200-W $CO_2$ Laser" by T. S. Fahlen, IEEE J. Quantum Electron. (corresp.) Vol. QEll, pp. 848-849, October 1975. In this system, the gas is rapidly recirculated through the laser electrode discharge gap and heat exchanger by means of a vane axial blower and motor located within the laser housing. While this system is comparatively compact and lightweight, it is incapable of meeting the ultra-high vacuum ($10^{-5}$ Torr) and gas purity requirements needed to achieve long life and efficient operation because, inter alia, of outgassing of the blower motor.

Another prior system is described in "Closed-Cycle Rare-Gas Electrical Discharge Laser", Final Report AFAL-TR-77-13 (1977), by R. Olson and D. Grosjean and utilizes a vane axial fan within a vacuum tight shell driven by a motor outside the shell. While this system maintained high vacuum integrity, it was approximately ten feet long and is believed to weigh several hundred pounds. This is clearly impracticable for space limited applications including airborne uses.

OBJECTS AND SUMMARY OF THE INVENTION

A general object of this invention is the provision of a gas laser system operable at a high pulse rate in a compact, high vacuum package.

A further object is the provision of a 2-4 micron laser having averaged pulsed output power greater than 5 watts and operable continuously for a period of several hours.

Still another object is the provision of such a laser that is relatively simple to maintain.

These and other objects of the invention are achieved with gas transport laser system featuring a vacuum-tight hermetically sealed housing divided internally into upper and lower recirculating gas channels and having a plurality of blowers within and at one end of the lower channel driven by motors outside the housing, a heat exchanger at the other end of the channels, and elongated electrodes spaced apart in the upper channel and energized by a pulse source to produce a discharge in the gas flowing between the electrodes. The housing is a unitary structure having blower, heat exchanger and optical window openings vacuum sealed by removable flange assemblies.

DESCRIPTION OF PREFERRED EMBODIMENT

Figure 1:
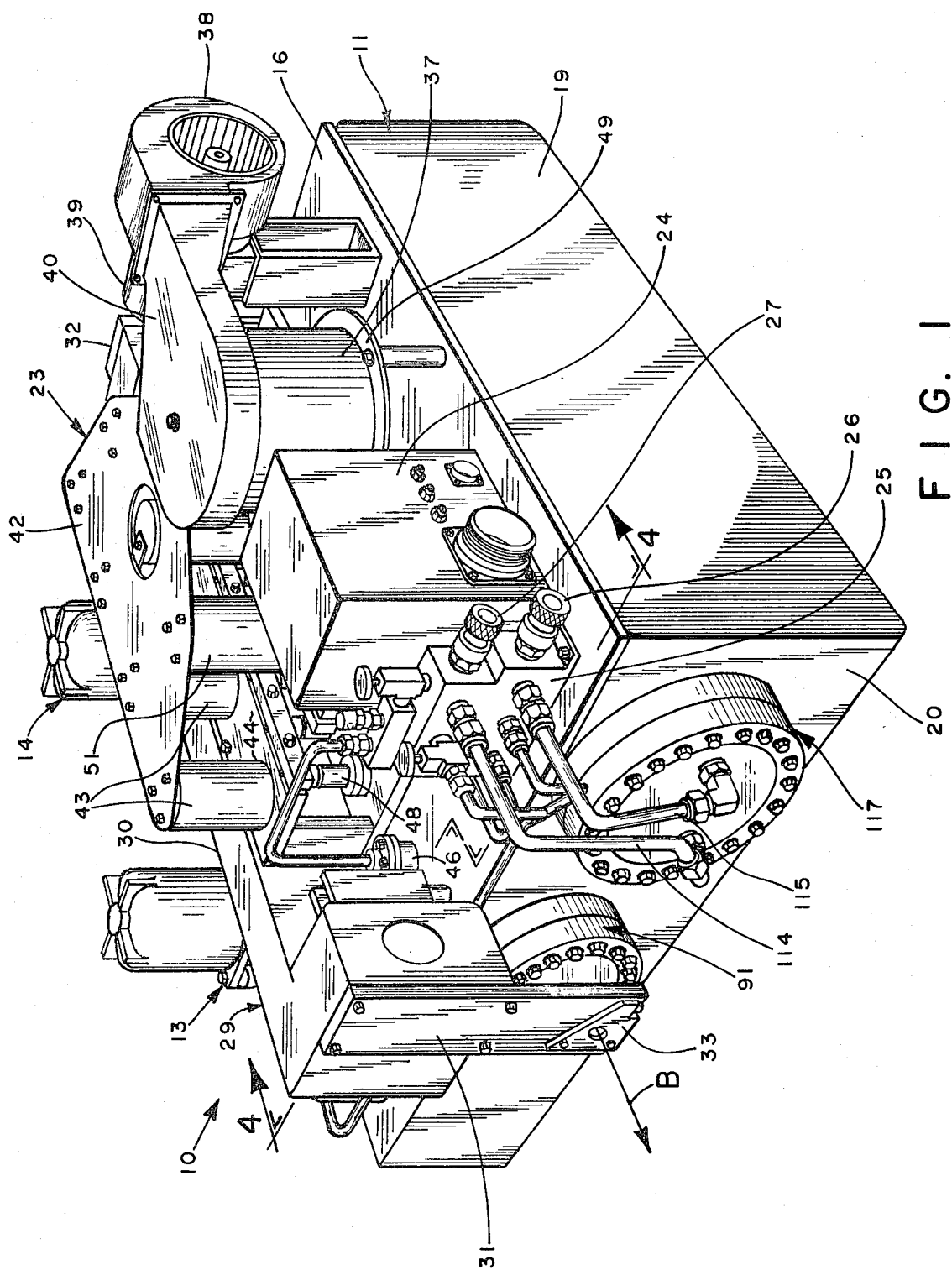
FIG. 1 is a perspective view of the gas transport laser embodying this invention as viewed from the output side of the laser.
Figure 2:
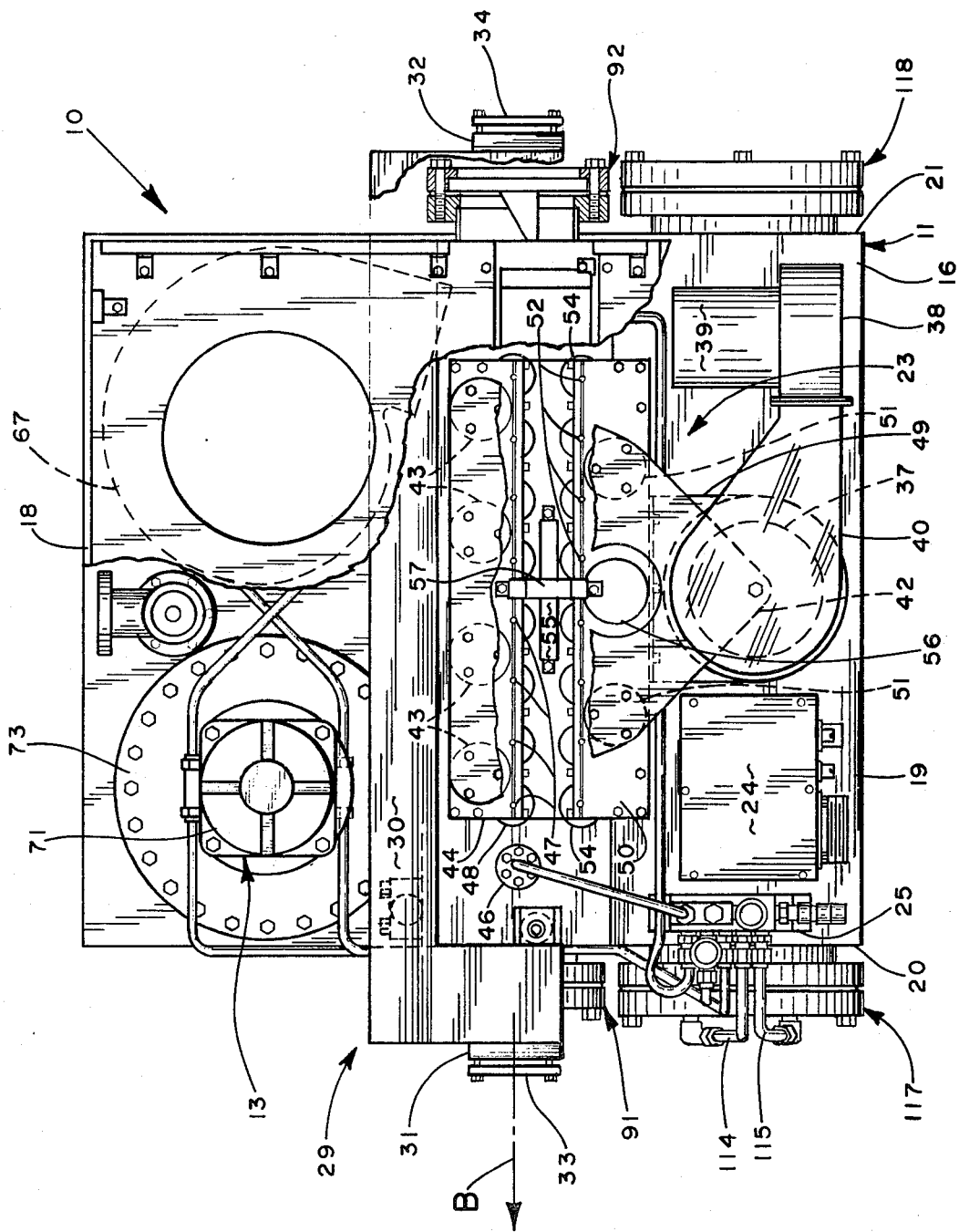
FIG. 2 is a plan view of the laser with portions broken away to show details of construction.

Referring now to the drawings, FIGS. 1 and 2 show a gas transport laser 10 embodying this invention comprising a hermetically sealed box-like housing 11 in which gas, such as a xenonhelium mixture, is circulated by two motor-fan assemblies 13 and 14 located at one end of the housing. The properties of xenonhelium mixture are such as to produce a laser beam at wavelengths of approximately 2–4 microns when used as a lasing medium. The housing preferably is made of stainless steel and comprises a top wall 16, a bottom wall 17, end walls 18 and 19, and front and rear walls 20 and 21, respectively. Each of the walls comprises a preferably stainless steel plate welded to the other walls to form a rigid unitary structure. A pulse forming network 23 is mounted on top wall 16 and is connected to an external high voltage power supply 121, see FIG. 6, through a distribution box 24 for energizing the laser to produce a beam along the laser optical axis B from front wall 20. A coolant, such as water, for the internal parts of the laser is distributed through a manifold assembly 25 which is coupled by connectors 26 and 27 to an outside coolant source, not shown. An external optical resonator assembly 29 is also mounted on the top wall and has an elongated U-shaped bench 30 having downwardly extending legs 31 and 32 overlying front wall 20 and rear wall 21, respectively, and providing a means for adjustably mounting mirror support plates 33 and 34, respectively, which define the laser cavity. The resonator structure is described in greater detail in our copending application Ser. No. 057,929.

Pulse forming network 23 comprises an electronic switch or thyratron 37 supported on and extending above housing top wall 16 approximately midway between the housing front and rear walls 20 and 21, respectively. A blower 38 driven by a motor 39 forces air through a casing 40 over the thyratron to cool it. One electrode (anode) of thyratron 37 is interconnected by connecting plate 42 and capacitors 43 to a connecting block 44 which is electrically connected to laser cathode 45. Cooling water feedthrough assemblies 46 direct water to the cathode through housing top wall 16 from manifold assembly 25. Laser cathode 45 is an elongated electrode extending a substantial portion of the length of the laser housing parallel to the laser axis and is engaged at a plurality of equally spaced locations, eight as shown in FIG. 2, along its length by connecting rods 47 which extend through housing top wall 16 for engagement by connecting block 44. Each cathode connecting rod is hermetically sealed to the housing top wall by a feedthrough assembly 48.

Structural details of the laser cathode 45, as well as the cathode feedthrough assemblies 48 are more completely described and claimed in our copending application Ser. No. 057,927.

The other electrode (cathode) of thyratron 37 is connected by plate 49 to the laser anode connecting block 50 and to plate 42 through capacitors 51. Block 50 is electrically connected to a plurality of rods 52 which extend through and are hermetically sealed to housing top wall 16 for connection to elongated laser anode 53 at a plurality of equally spaced points, eight as shown in FIG. 2, along its length. An anode feedthrough assembly 54 similar to assembly 48 for each cathode rod 47 provides the hermetic seal between each anode rod 52 and housing top wall 16. A charging resistor 55 is connected across the laser cathode and anode via blocks 44 and 50. A peaking capacitor 56 is connected to block 50 and by strap 57 to block 44.

The operation of the pulse forming network is described below in conjunction with FIG. 6.

Figure 3:
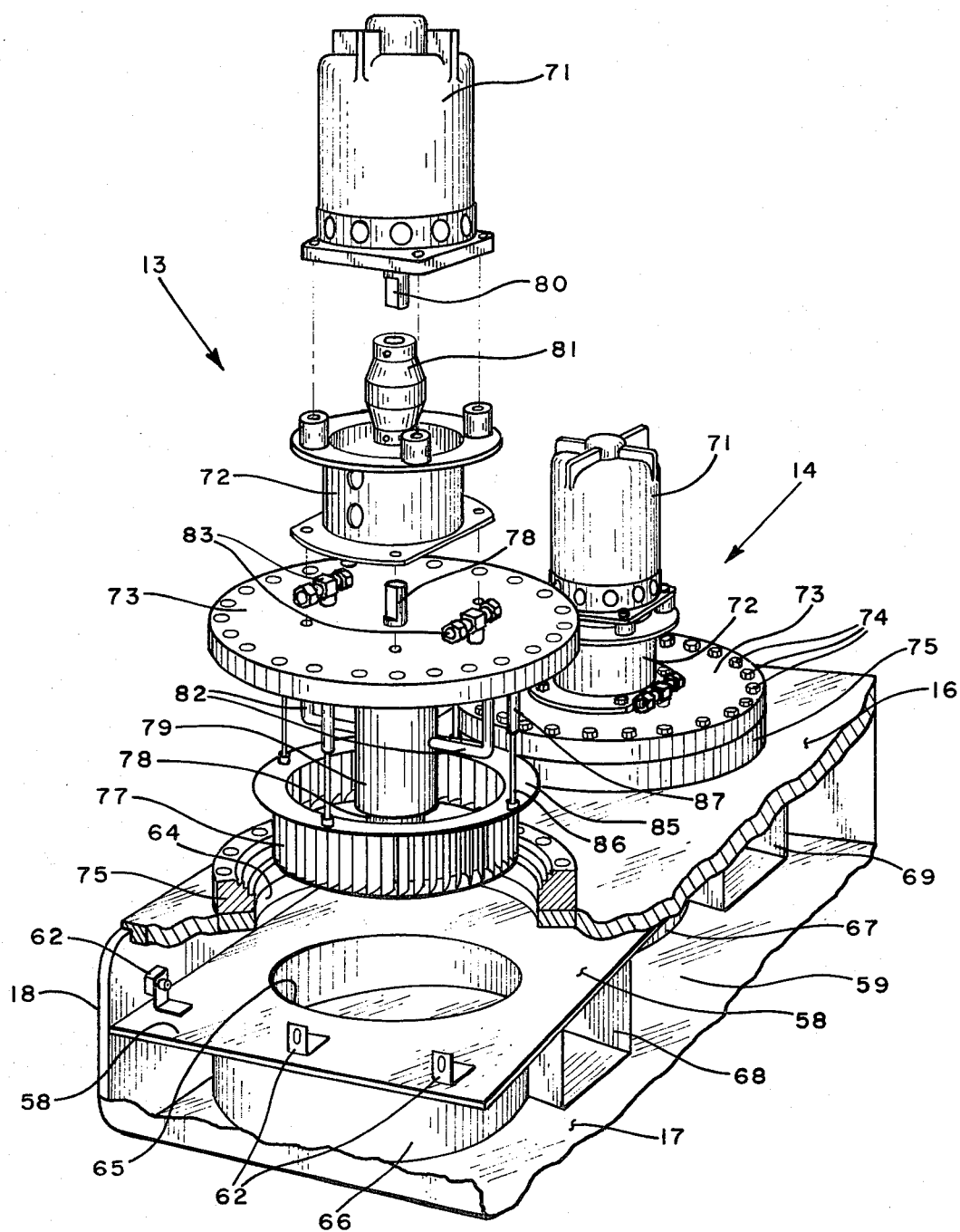
FIG. 3 is an enlarged perspective view of the blower end portion of the laser showing one of the blower-motor assemblies in exploded form.
Figure 4:
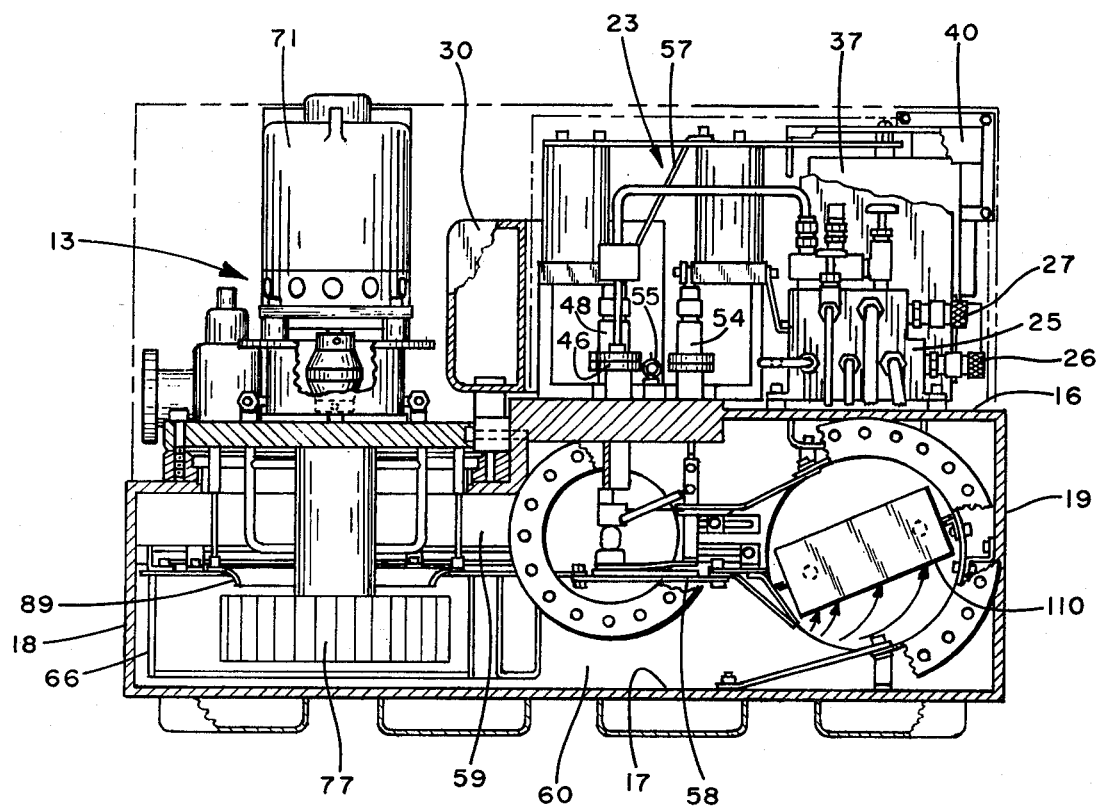
FIG. 4 is a transverse section of the laser taken on line 4—4 of FIG. 1.
Figure 5:
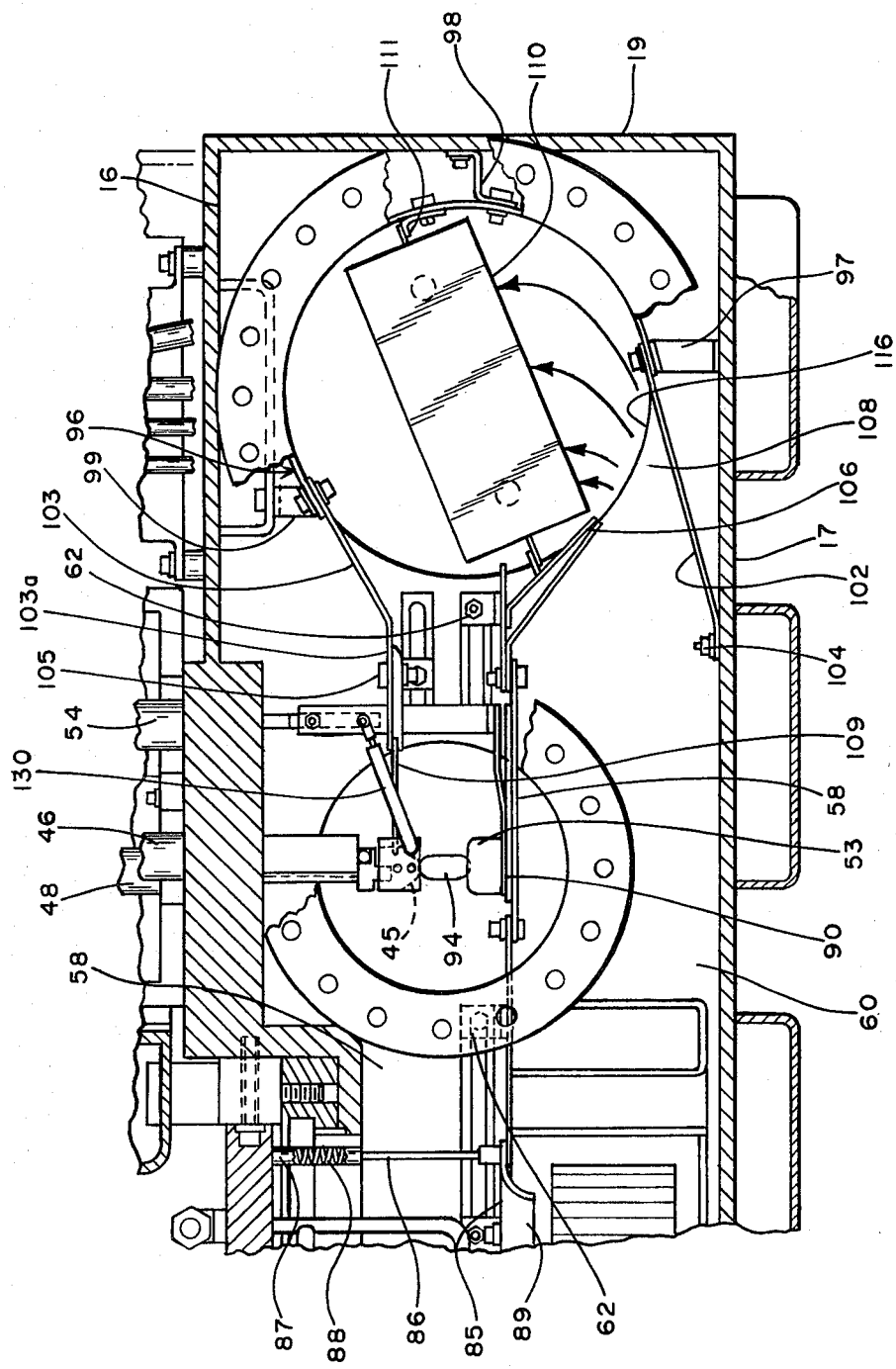
FIG. 5 is an enlarged view of part of FIG. 4 showing details of construction.

The interior of housing 11 is divided by a central plane partition 58, see FIGS. 3, 4 and 5, into an upper channel 59 between the partition and top wall 16 and a lower channel 60 between the partition and bottom wall 17. Partition 58 extends between and engages front wall 20, rear wall 21 and end wall 18 and is supported thereon by brackets 62. In order to accommodate motorfan assemblies 13 and 14, top wall 16 is formed with two circular openings, one of which is shown at 64 in FIG. 3, and partition 58 is formed with openings 65 coaxial with and having diameters smaller than those of openings 64. Scroll-shaped fan casings 66 and 67 disposed in the lower channel concentric with partition openings 65 are secured to the under side of the partition and have exhaust ports 68 and 69, respectively, facing the central part of the lower channel.

Motor-fan assemblies 13 and 14 are substantially identical and accordingly a description of one of them will be sufficient for an understanding of the invention, like reference characters indicating like parts on the drawings. Assembly 13 comprises motor 71 secured by a mounting bracket 72 to a flange plate 73 which in turn is removably secured by bolts 74 to a flange ring 75. Ring 75 is coaxial with and has an inside diameter equal to that of housing opening 64 and is brazed or otherwise permanently secured and sealed to the housing top wall. When flange plate 73 is bolted to ring 75, a metal gasket, not shown, forms a vacuum-tight metal-to-metal seal between these parts. Plate 73 and ring 75 comprise a flange assembly which is commercially available, an example being Conflat flanges made by Varian Associates, Palo alo, California.

A squirrel cage fan 77 is supported on a shaft 78 which extends from the fan through a water jacket 79 and projects through and above flange plate 73. Shaft 78 makes a vacuum-tight sealing engagement with plate 73 preferably by a ferro-fluidic seal manufactured and sold by Ferrofluidics Corporation and is mechanically connected to motor shaft 80 by a shock coupling 81. Jacket 79 is connected by tubes 82 to fittings 83 on the top of flange plate 73 for connection via manifold 25 to the external cooling system. The purpose of jacket 79 is to prevent overheating of the fan shaft from hot gas flowing from the laser discharge zone.

In order to direct the flow of gas from the upper channel into fan casing 66 in the lower chanel, a flow guide ring 85 is suspended from the underside of flange ring 75 by a plurality of resilient supports, each comprising a post 86 secured to ring 85 and telescoped into a sleeve 87 secured to plate 73. Springs, one of which is indicated at 88 in FIG. 5, are disposed in sleeves 87 and resiliently bias posts 86 downwardly from plate 73. Ring 85 has an outside diameter slightly smaller than top wall opening 64 and slightly larger than partition opening 65 so as to pass through the top wall and engage the marginal edge portions of the latter. When the fan is assembled into the housing and plate 73 is bolted to flange ring 75, guide ring 85 is biased by springs 88 into tight engagement with the partition and directs the flow of air from the upper channel into the center of the ring for passage into the fan unit. The inner edge of ring 85 is flared downwardly as shown at 89 in FIGS. 4 and 5 to provide a smooth transition in the 90 degree change in direction of flow of the gas being from the upper channel into the throat of fan 77.

The squirrel cage configuration of fan 77 uniquely contributes to the minimum height of the laser housing in two ways: the smaller dimension of the fan, i.e., its axial width, extends vertically, and the rotation of the fan about a vertical axis effects a 90 degree change in direction of gas flow without undue turbulence. Thus a 180° change in direction of gas flowing in the upper and lower channels is affected efficiently and without bulky flow vanes and guides.

Laser cathode 45 is spaced about midway between and parallel to top wall 16 and partition 58 at the end of the cathode feedthrough assembly 48, see FIG. 5. Laser anode 53 is coextensive with, parallel to and spaced downwardly from cathode 45, is electrically connected to the lower end of anode feedthrough assembly 54 and is supported by an insulator on partition 58. The space between cathode 45 and anode 53 defines the discharge zone of the laser which is aligned with Brewster windows mounted in flange assemblies 91 and 92 on the front and rear walls 20 and 21, respectively. One of the Brewster windows is indicated at 94 in FIG. 5. The laser beam generated in the discharge zone passes through the Brewster windows with minimum loss and is resonated by mirrors mounted on support plates 33 and 34 of optical resonator assembly 29.

Central partition 58 is spaced from housing end wall 19 to define an opening connecting the upper and lower channels for the circulation of gas therebetween. In order to provide for a smooth nonturbulent movement of gas from the lower channel to the upper channel, a generally U-shaped flow guide 96 is supported by brackets 97, 98 and 99 on bottom wall 17, end wall 19 and top wall 16, respectively. Guide 96 has sides 102 and 103 which overlie the proximate end of partition 58, side 102 being secured to housing bottom wall 17 by bolt 104. The end portion 103a of side 103 is parallel with partition 58 and is secured to the front and rear housing walls by brackets, one of which is indicated at 105 on the drawing. The spacing between guide end portion 103a and partition 58 is substantially less than the maximum dimension of guide 96. An extension 106 is secured to and projects diagonally downwardly from the end of the partition 58 into the lower channel and is spaced from side 102 of guide 96 to define an inlet passage 108 into the guide. A flat insulator sheet 109 is secured to and extends between guide end portion 103a and the cathode assembly to confine the flow of gas substantially to the space between the laser electrodes. The spacing between partition 58 and guide end portion 103a together with sheet 109 is substantially less than the maximum inside dimension of guide 96 and so the guide is shaped and disposed relative to partition 58 to taper from a maximum dimension adjacent to the end of the housing to a minimum dimension at the electrodes so as to increase the velocity of gas flowing across the discharge gap.

In order to cool the gas heated by the electrical discharge, a water-cooled heat exchanger 110 is mounted within flow guide 96 so as to extend substantially the full length of the housing. Heat exchanger 110 has a rectangular profile as shown in FIGS. 4 and 5 and is supported on flow guide 96 by bracket 111 and on extension 106 so that the long cross-sectional dimension of the exchanger is inclined upwardly from the end of partition 58 at approximately a 30° angle to the plane of the partition. Such orientation of the heat exchanger minimizes space requirements within the housing and permits the exchanger to function more effectively as gas flow vanes for reducing turbulence and enhancing laminar flow in the gas prior to its entry into the high velocity portion of the upper chamber. Gas flow is indicated by the curved arrowed lines. Heat exchanger 110 is connected by conduits 114 and 115, see FIG. 1, to the coolant manifold assembly 25.

In order to permit installation and removal of heat exchanger 110 in housing 11, front and rear walls 20 and 21, respectively, have openings slightly larger than the cross-sectional dimensions of the heat exchanger, one of these openings being indicated at 116. These openings are sealed by flange assemblies 117 and 118, respectively, similar to flange assemblies 91 and 92 and providing a vacuum-tight seal to maintain the high vacuum within the housing.

Figure 6:
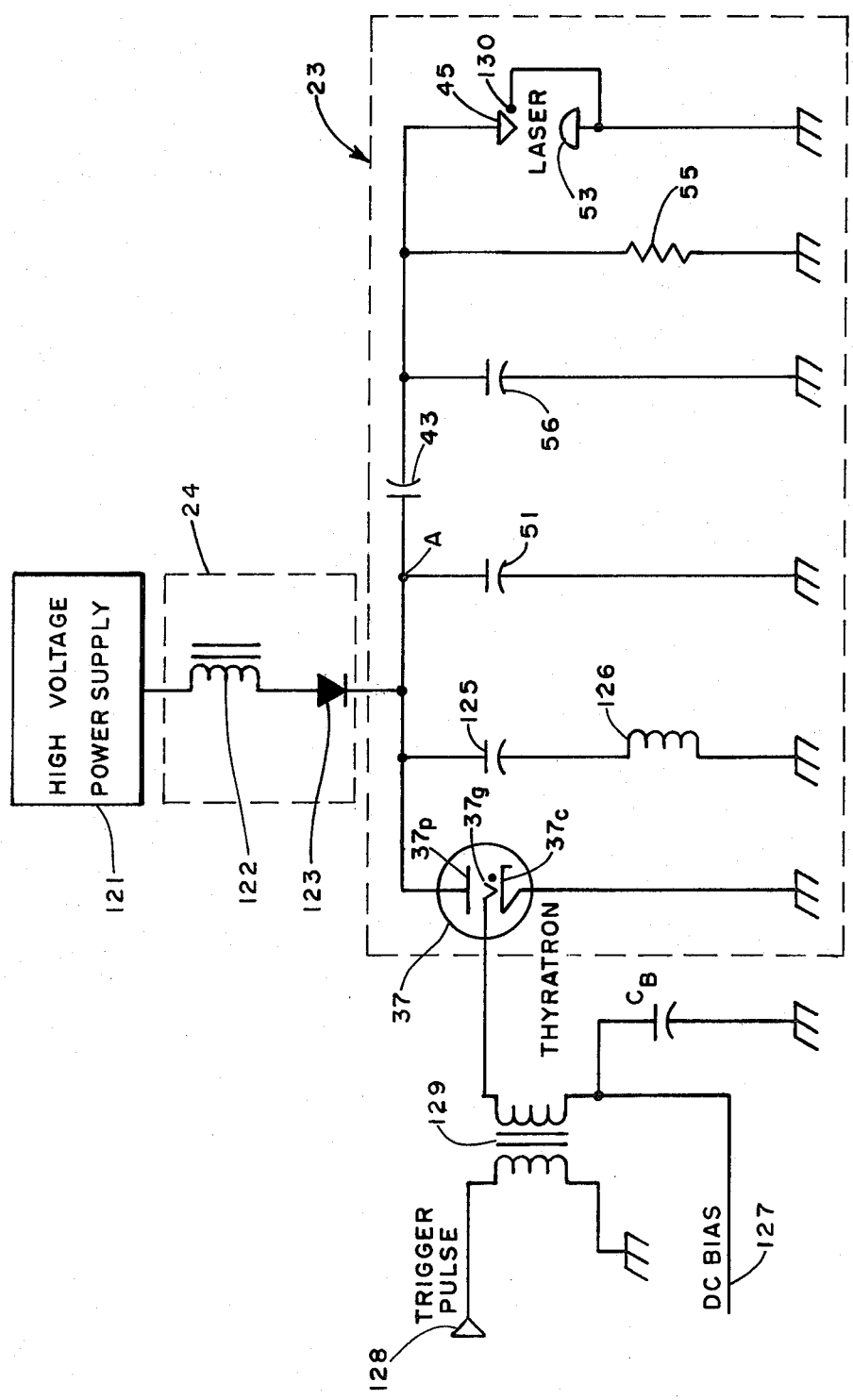
FIG. 6 is a schematic diagram showing the pulse forming network which energizes the laser electrodes.

A schematic diagram of the pulse forming network 23 is shown in FIG. 6. An external high voltage power supply 121 is connected to the plate 37p of the thyratron 37 through a choke coil 122 and diode 123 preferably contained in distribution box 24. Diode 123 is also connected to primary storage capacitors 51 and 43, the latter having its opposite electrode connected to capacitor 56, resistor 55 and laser cathode 45. Cathode 37c of thyratron 37 and laser anode 53 are connected together and to the other sides of capacitors 51 and 56 and resistor 55 as indicated by the common connection to ground of these components. In addition, a capacitor 125 and inductor 126 are connected in series with each other and in parallel with thyratron plate 37p and cathode 37c. Grid 37g is connected to a source 127 of negative d-c voltage which biases the thyratron into the non-conducting state. A source 128 of a trigger voltage is connected via transformer 129 to thyratron grid 37g and provides positive pulses at the desired frequency.

Preionization electrode 130 adjacent to laser cathode 45 is electrically connected to laser cathode 53 to facilitate establishment of the discharge across the laser gap when thyratron 37 is switched on.

The operation of the pulse forming circuit is now described. Power supply 121 resonantly charges primary storage capacitors 51 and 43 through choke 122 and diode 123 thereby producing a charge on the capacitors which is double the rated output voltage of power supply 121. Thus if the power supply has a rated output of 3 Kv, the voltage at junction A between fully charged capacitors 43 and 51 is +6 Kv while the voltage on laser cathode is zero. A trigger pulse applied to grid 37g of thyratron 37 fires the latter and essentially grounds plate 37p. This discharges capacitors 43 and 51 through the thyratron so that point A swings from +6 Kv (in the above example) toward −6 Kv and the voltage on laser cathode changes rapidly from zero toward −12 Kv. During this transition, gas in the interelectrode gap of the laser breaks down and lases to produce a pulse of coherent light as the output of the laser.

When the discharge of capacitors 43 and 51 is complete, the laser discharge ends, thyratron 37 returns to the non-conducting or "off" state, and capacitors 43 and 51 are recharged by power supply 121. The network is then ready for another discharge cycle initiated by a trigger pulse on thyratron grid 37g and the cycle is repeated. The values of choke 122 and capacitors 43 and 51 are selected to produce the desired capacitor charge rate which is the pulse repetition frequency of the system. The d-c bias on the thyratron is negative which contributes to the quick recovery of the latter fafter discharge. In addition, capacitor 125 and inductors 12 aid in the fast recovery of the thyratron.

Capacitor 56 is a peaking capacitor for decreasing the current rise time across the laser electrodes. It's use is optional.

A laser head embodying this invention which has been built and successfully operated has the following physical and operating characteristics:

| Parameter | Performance | Comments |
| --- | --- | --- |
| Gas | HeXe | |
| Wavelength (μ) | 2.03 | 54.3% with uncoated Ge |
| | 2.65 | 12.0% mirror and double |
| | 3.43 | 16.4% pass optics |
| | 3.65 | 17.3% |
| | 3.87 | Seen only with single pass |
| Average Power (W) | >8W | Depends on PRF |
| Pulse Rate (KHz) | 0–7 | |
| Pulse Width | 50–100nsec spike with ≈1 μsec tail | Can be varied somewhat with gas mix and pressure |
| Amplitude Stability | ±2.5% | |
| Beam Divergence | 3.7 mrad | Double pass |
| Beam size | 10 mm | |
| Weight | ≈400 lb. | |
| Size | 80 × 68 × 47 cm$^3$ | |

What is claimed is:

1. A gas transport laser comprising:
   a hermetically sealed housing having an internal central plane partition dividing the housing interior into an upper channel and a lower channel interconnected at opposite ends to permit gas to recirculate in one direction through the upper channel and in the opposite direction through the lower channel,
   a heat exchanger supported on said housing at one of said ends of said channels,
   a plurality of blowers disposed in said lower channel at the other of said ends, each of said blowers having an axis of rotation extending perpendicular to the plane of said partition, said blowers having intake port means disposed to draw the gas from said upper channel into said intake port means parallel to said axes of rotation and having exhaust port means arranged to expel the gas into said lower channel at high velocity perpendicular to said axes, a motor mounted on the exterior of said housing for each of said blowers, each of said motors having a shaft extending through said housing and mechanically connected to the associated blower, means for hermetically sealing each of said shafts to said housing, an elongated anode in said upper channel extending adjacent to said partition transversely of the direction of gas flow between said channel ends, an elongated cathode spaced above and extending parallel to said anodes and defining therewith a discharge gap.

2. The laser according to claim 1 in which said housing has parallel side walls, at least one of said side walls having opening at said one end of the housing, said opening having a dimension larger than the external cross-sectional dimension of said heat exchanger whereby the latter is insertable into and removable from said one end of housing through said opening, and means to seal said opening.

3. The laser according to claim 2 in which said sealing means comprises flange means having an inner ring permanently sealed to said housing and an outer ring removably secured to and sealed against said inner ring.

4. The laser according to claim 2 in which said heat exchanger has a rectangular cross-section and is disposed between the adjacent housing end wall and said partition at an angle to the plane of the partition.

5. The laser according to claim 1 in which said housing has parallel side walls, each of side walls having an opening aligned with each and with said discharge gap, window means sealed in each of said openings, and mirror means supported externally on said housing in alignment with said window means defining the optical resonator of the laser.

6. The laser according to claim 1 in which said housing has a top wall having at least two openings therein adjacent said other end thereof through which said shafts, respectively, of the motors extend, said partition having openings coaxial with said openings, respectively, in said top wall, and flange means at each of said top wall openings for sealing same comprising a ring permanently secured to said top wall and a plate removably secured to and sealed against said ring, said plate of each flange means having a bore for receiving and sealing the shaft of the associated motor.

7. The laser according to claim 6 in which said partition openings have transverse dimensions greater than the corresponding dimensions of the respective blowers whereby the latter are insertable therethrough into said lower channel, sealing discs mounted on and under said plates, respectively, and overlaying the marginal edge portions of said partition openings, respectively, and spring means between said plates and said discs for resiliently biasing the latter into engagement with said partition when said plates are secured to said rings, respectively, on said top wall.

8. The laser according to claim 7 in which said discs have downwardly curved inner edge portions whereby to direct gas flow from the upper channel into said blowers.

9. The laser according to claim 7 with means for cooling the portions of said motor shafts between said housing top wall and said blowers.

10. The laser according to claim 9 in which said cooling means comprises a cylindrical jacket around each of said motor shafts, and conduits extending through each of said plates and connected to each of said jackets whereby external coolant means is circulated through said conduits and said jackets.

11. A gas transport laser comprising:
a housing having parallel said walls and parallel end walls and parallel top and bottom walls defining a chamber, a plane partition supported on said side walls midway between and parallel to said top and bottom walls, said partition dividing said chamber into an upper channel and a lower channel, squirrel cage blower in said lower channel adjacent to one of said end plates and having an axis of rotatiion perpendicular to said partition, a casing around said blower having an exhaust port and adapted to direct the blower output through said port toward the other of said end plates, said partition having a circular opening coaxial with said blower defining the blower intake port, motor means mounted externally on said housing and operatively connected to said blower for rotating same whereby gas is moved from the upper channel through said circular partition openings and out said exhaust port, gas cooling means in said housing, gas flow guide means supported on the interior of said housing between said partition and the other of said housing end walls, said guide means extending from said lower channel to said upper channel and being curved for reversing the direction of gas flowing from the lower channel to the upper channel, electrode means in said upper channel, power supply means mounted on the exterior of said top plate and operatively connected to said electrode means whereby an electric discharge is generated in the gas flowing in said upper channel, and optical resonator means aligned with said electrode means.

12. The laser according to claim 11 in which said side plates have Brewster windows aligned with said electrode means, said resonator means comprising optical reflectors mounted on the exterior of said housing in alignment with said windows and said electrode means.

* * * * *